US012017234B2

(12) United States Patent
Park

(10) Patent No.: US 12,017,234 B2
(45) Date of Patent: Jun. 25, 2024

(54) NOZZLE APPARATUS AND APPARATUS FOR TREATING SUBSTRATE

(71) Applicant: SEMES CO., LTD., Chungcheongnam-do (KR)

(72) Inventor: Min Jung Park, Daegu (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 513 days.

(21) Appl. No.: 17/225,892

(22) Filed: Apr. 8, 2021

(65) Prior Publication Data

US 2021/0316319 A1 Oct. 14, 2021

(30) Foreign Application Priority Data

Apr. 8, 2020 (KR) ........................ 10-2020-0042877

(51) Int. Cl.

*B05B 1/04* (2006.01)
*B05B 3/02* (2006.01)
*B05C 5/02* (2006.01)

(52) U.S. Cl.

CPC .............. *B05B 1/044* (2013.01); *B05B 3/025* (2013.01); *B05C 5/0254* (2013.01)

(58) Field of Classification Search

None

See application file for complete search history.

(56) References Cited

U.S. PATENT DOCUMENTS

| | | | | |
|---|---|---|---|---|
| 2004/0250839 A1* | 12/2004 | Robertson | G03F 7/168 | 134/140 |
| 2006/0040051 A1* | 2/2006 | Yamamoto | G03F 7/3028 | 427/256 |
| 2016/0151801 A1* | 6/2016 | Ogura | G03F 7/162 | 427/256 |
| 2017/0287743 A1* | 10/2017 | Kobayashi | H01L 21/02052 | |

FOREIGN PATENT DOCUMENTS

| | | | |
|---|---|---|---|
| CN | 1625797 | A | 6/2005 |
| CN | 1745455 | A | 3/2006 |
| CN | 1918694 | A | 2/2007 |
| CN | 105280478 | A | 1/2016 |
| CN | 108355869 | A | 8/2018 |
| CN | 108803257 | A | 11/2018 |
| JP | 2000162424 | A | 6/2000 |
| JP | 2018171609 | A | 11/2018 |
| KR | 1020090011208 | A | 2/2009 |
| KR | 10-2009-0037075 | A | 4/2009 |

(Continued)

OTHER PUBLICATIONS

KR 10-2010-0059432 translation, Nozzle, Apparatus and Method for Processing a Substrate the Same, Park (Year: 2010).*

*Primary Examiner* — Cristi J Tate-Sims

(74) *Attorney, Agent, or Firm* — Procopio, Cory, Hargreaves & Savitch LLP

(57) ABSTRACT

A nozzle apparatus may comprise a nozzle body having a nozzle tip with a discharge port for spraying a treatment fluid onto a substrate; a nozzle moving member for moving the nozzle body relative to the substrate; a rotating member for rotating the nozzle body or the nozzle tip so that a treatment (Continued)

fluid is sprayed onto the substrate during rotation; and a control unit configured to control an operation of the nozzle moving member and the rotating member.

18 Claims, 10 Drawing Sheets

(56) References Cited

FOREIGN PATENT DOCUMENTS

| | | | |
|---|---|---|---|
| KR | 1020090073355 | A | 7/2009 |
| KR | 10-2010-0046898 | A | 5/2010 |
| KR | 1020100059432 | A | 6/2010 |
| KR | 1020150016888 | A | 2/2015 |
| KR | 1020150016899 | A | 2/2015 |
| KR | 10-2017-0080976 | A | 7/2017 |
| KR | 1020170123467 | A | 11/2017 |
| KR | 10-2018-0087391 | A | 8/2018 |
| KR | 10-2019-0131430 | A | 11/2019 |

* cited by examiner

NOZZLE APPARATUS AND APPARATUS FOR TREATING SUBSTRATE

CROSS-REFERENCE TO RELATED APPLICATION

A claim for priority under 35 U.S.C. § 119 is made to Korean Patent Application No. 10-2020-0042877 filed on Apr. 8, 2020, in the Korean Intellectual Property Office, the entire contents of which are hereby incorporated by reference.

FIELD OF THE INVENTION

The present disclosure relates to a nozzle apparatus and apparatus for treating substrate.

BACKGROUND

In semiconductor manufacturing, a photo lithography process is to create a desired pattern on a wafer. The photo lithography is usually carried out in a spinner apparatus where coating process, exposure process and developing process are continuously processed as exposure equipment is connected. Such spinner apparatus performs sequentially or selectively HMDS (Hexamethyldisilazane) process, coating process, bake process and developing process.

The developing process is a process of applying a chemical liquid (developer) to a surface of a substrate, and the substrate rotates at a low speed to prevent splashing of the chemical liquid, and a nozzle sprays the developer onto the substrate in a diagonal discharge method. At this time, the substrate is wetted by the chemical liquid sprayed from the nozzle in a fan shape, having a relatively weaker hitting force than in a vertical discharge method.

SUMMARY

The present disclosure is directed to providing a nozzle apparatus and substrate treatment apparatus capable of reducing a shape of a chemical liquid sprayed onto a substrate and increasing a hitting force.

The present disclosure is directed to providing a nozzle apparatus and substrate treatment apparatus in which a vertical discharge method is combined with a diagonal discharge method through a slot discharge port.

The problem to be solved by the present invention is not limited to the problem mentioned above. Other technical problems not mentioned will be clearly understood by those having ordinary skill in the art from the accompanying descriptions.

According to an aspect of the present disclosure, a nozzle apparatus may comprise: a nozzle body having a nozzle tip with a discharge port for spraying a treatment fluid onto a substrate; a nozzle moving member for moving the nozzle body relative to the substrate; a rotating member for rotating the nozzle body or the nozzle tip so that a treatment fluid is rotationally sprayed onto the substrate; and a control unit configured to control an operation of the nozzle moving member and the rotating member.

Additionally, the discharge port may have a slip shape and may be provided to spray the treatment fluid at a predetermined angle inclined to the substrate surface.

Additionally, rotation of the nozzle body or the nozzle tip may correspond to the discharge direction of the treatment fluid.

According to another aspect of the present disclosure, a substrate treatment apparatus may comprise: a supporter rotating in one direction with a substrate seated thereon, a nozzle apparatus having a nozzle body for spraying a treatment fluid onto a substrate from an upper portion of the supporter, wherein the nozzle body sprays the treatment fluid onto the substrate while scanning and rotating.

Additionally, the nozzle body may rotate in a direction opposite to the rotation direction of the supporter.

Additionally, the nozzle body may be provided with a discharge port in a slip shape.

Additionally, the nozzle body may be provided with a plurality of holes in which the discharge port is disposed along one direction.

Additionally, the nozzle apparatus may further comprise a rotating member for rotating the nozzle body.

Additionally, the nozzle body may have a nozzle tip for spraying the chemical liquid at a predetermined angle inclined to the substrate surface.

Additionally, the nozzle apparatus further comprises: a nozzle moving member for moving the nozzle body relative to the supporter; and a control unit for controlling an operation of the nozzle moving member, wherein the nozzle body comprises: a nozzle tip rotationally provided in the nozzle body and having a discharge port with a slip shaped cross-section; and a rotating member for rotating the nozzle tip. The control unit may control an operation of the nozzle moving means and the rotating member so that the nozzle tip rotates and discharges a chemical liquid from the discharge port while moving the nozzle body over the substrate.

Additionally, the rotation axis corresponds to the discharge direction of the discharge port, wherein the discharge port has a slit shape and may be provided to spray the chemical liquid at a predetermined angle inclined to the substrate surface.

According to an embodiment of the present disclosure, it is possible to reduce the shape-ability of the chemical liquid sprayed onto the substrate and increase the hitting force.

According to an embodiment of the present disclosure, it is possible to improve the separation effect of particles and residues on the substrate by combining the vertical discharge method through a circular discharge port and the diagonal discharge method through a slot discharge port, and increase the wetting force of the treatment fluid. Moreover, it is advantageous for puddle formation and may be effective for high-precision development.

The effects of the present disclosure are not limited to the aforementioned described effects. Effects not mentioned will be clearly understood by those having ordinary skill in the art from the present specification and the accompanying drawings.

DETAILED DESCRIPTION

Figure 1:
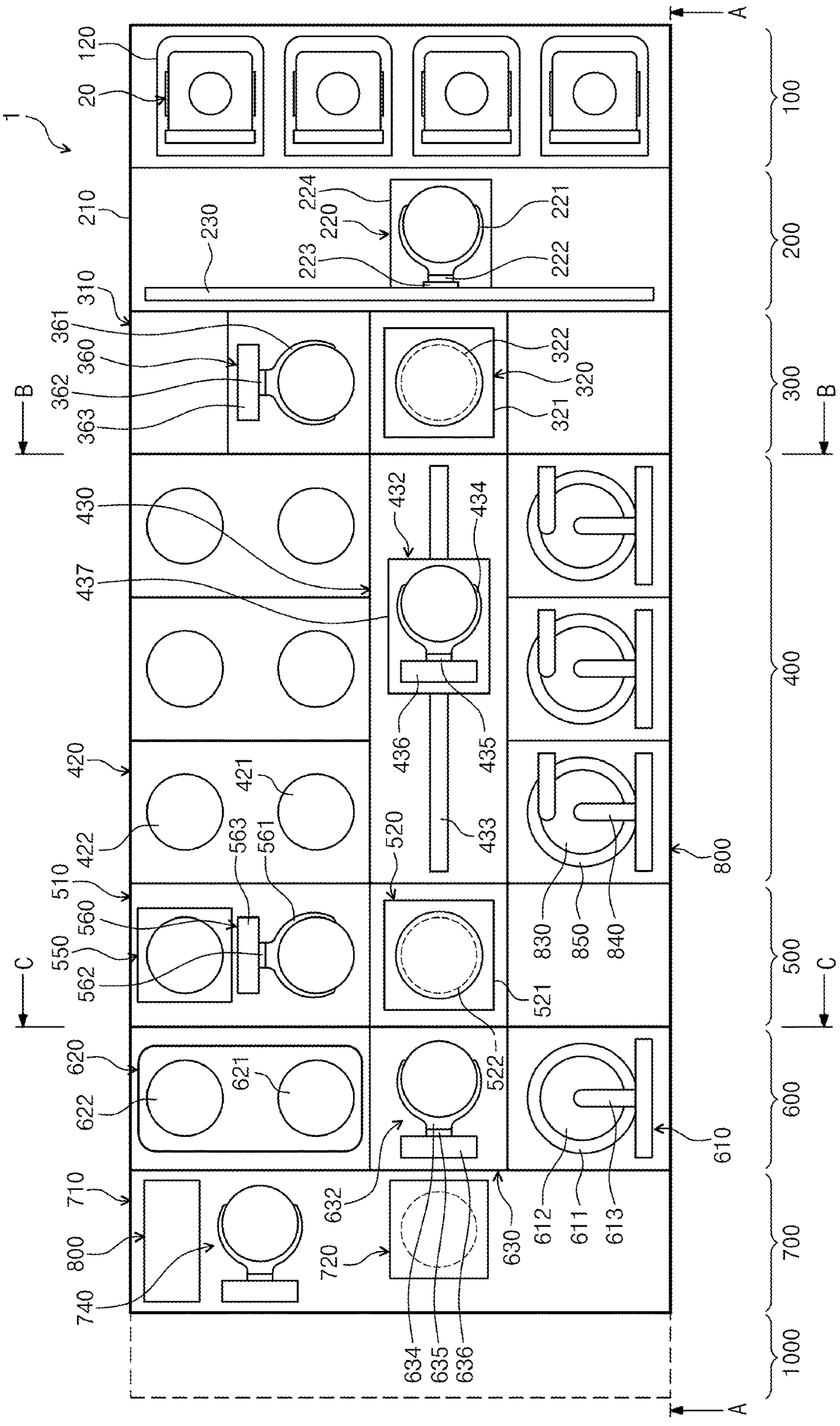
FIG. 1 is a plan view of a substrate treatment apparatus according to a first embodiment of the present disclosure.

Hereinafter, embodiments of the present disclosure will be described in more detail with reference to the accompanying drawings. The embodiments of the present disclosure may be modified in various forms, and the scope of the present disclosure should not be construed as being limited to the following embodiments. This embodiment is provided to more completely describe the present disclosure to those having ordinary skill in the art. Therefore, the shape of the element in the drawings is exaggerated to emphasize a clearer description.

The apparatus of the embodiment may be used to perform a photolithography process on a substrate including a semiconductor wafer or a flat display panel. Particularly, the apparatus of the embodiment may be used to perform a coating and developing process on a substrate by being connected to an exposure apparatus. In the following, a wafer used as a substrate will be described as an example.

Hereinafter, a substrate treatment apparatus of the present disclosure will be described with reference to FIGS. 1 to 8.

Figure 2:
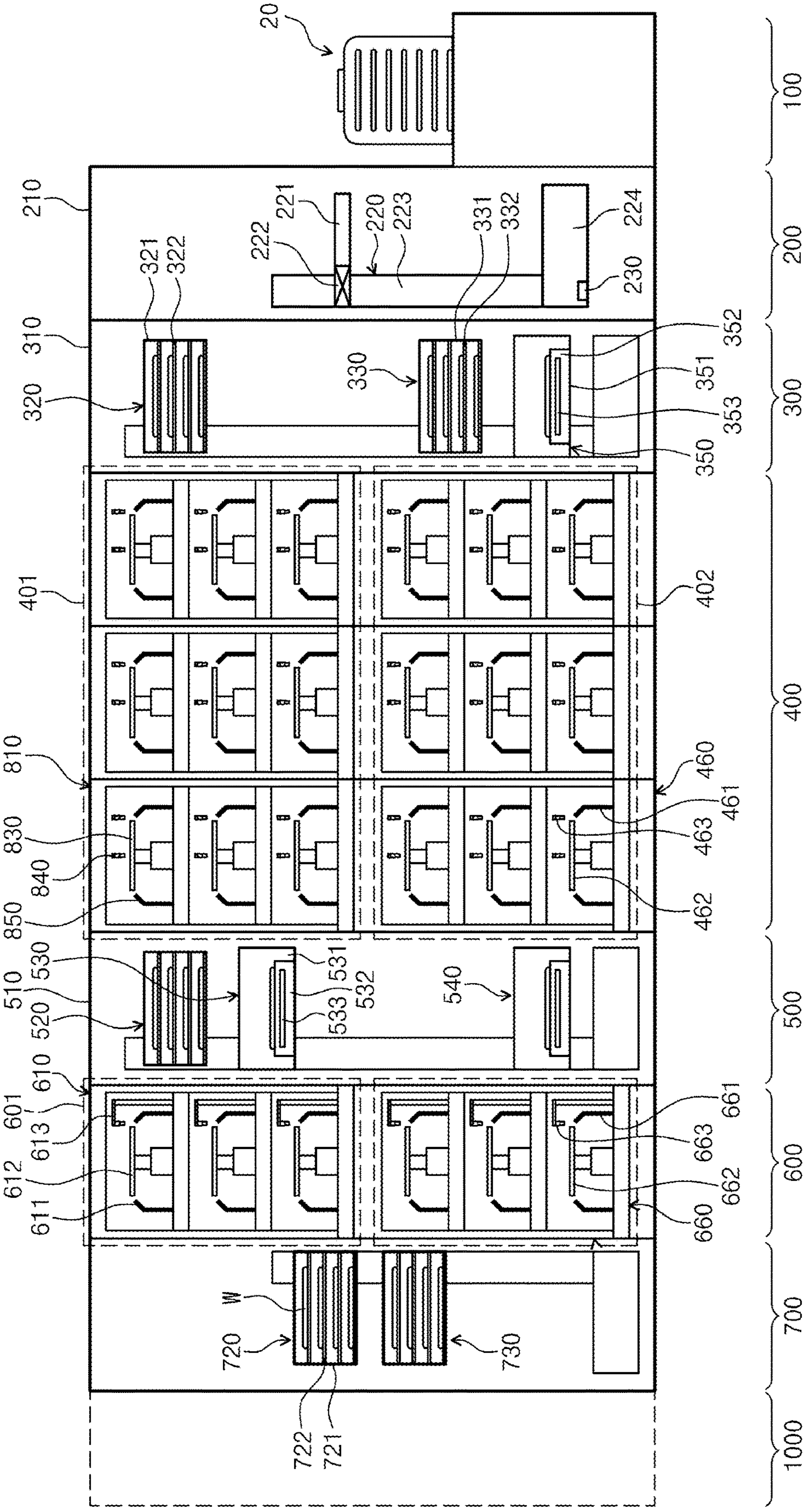
FIG. 2 is a cross-sectional view of the apparatus of FIG. 1 from a direction A-A.
Figure 3:
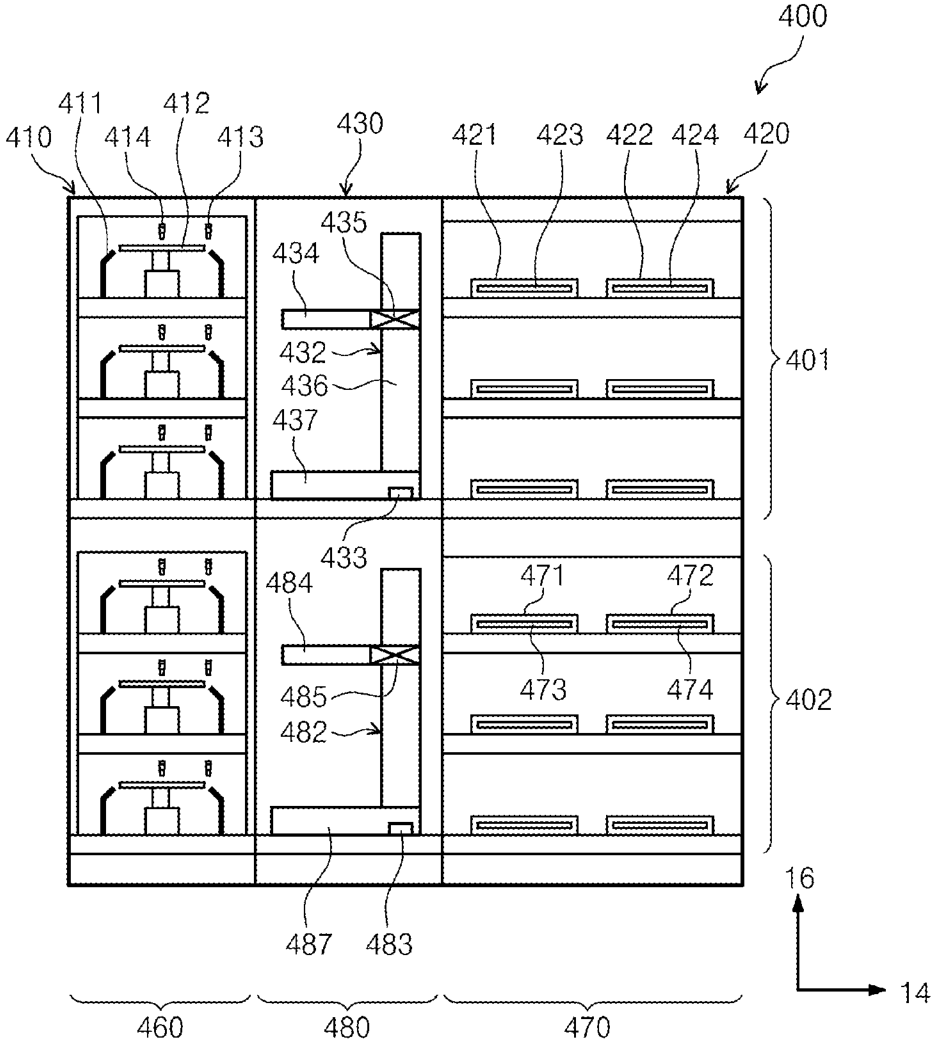
FIG. 3 is a cross-sectional view of the apparatus of FIG. 1 from a direction B-B.
Figure 4:
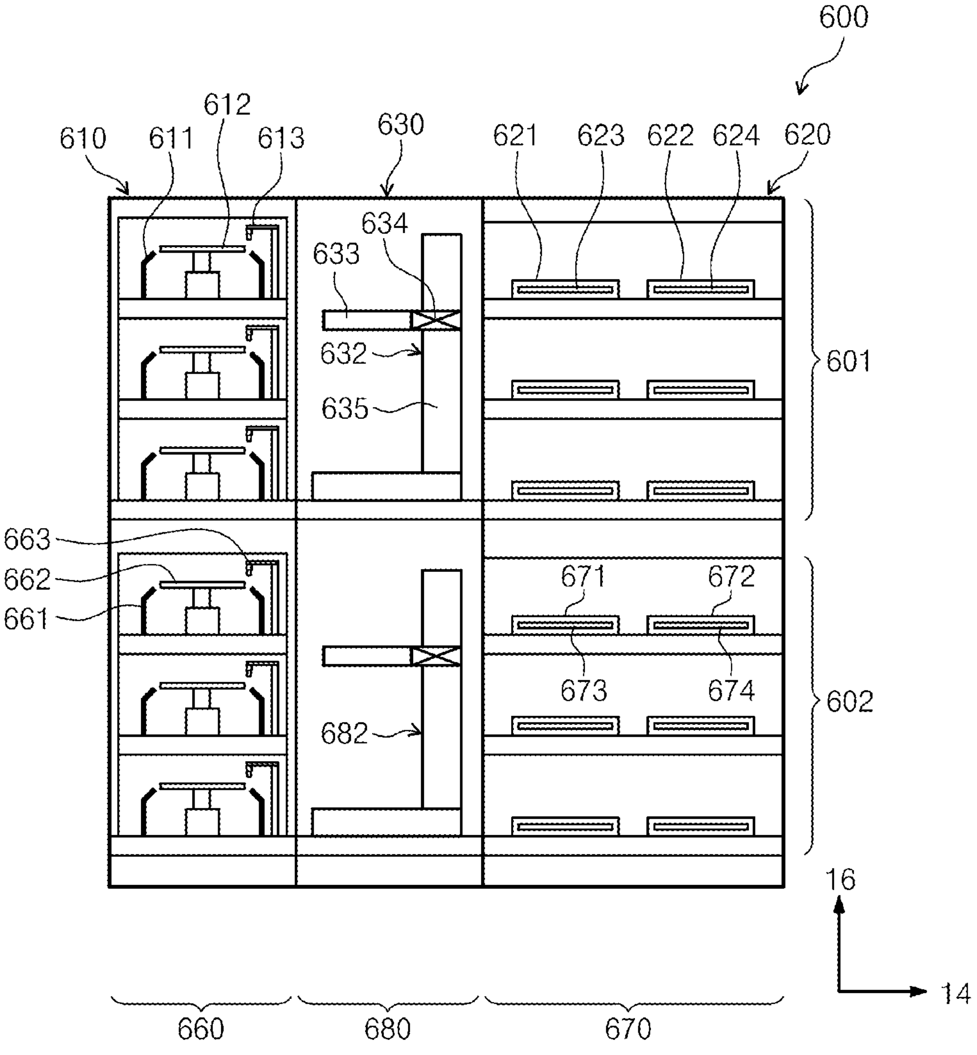
FIG. 4 is a cross-sectional view of the apparatus of FIG. 1 from a direction C-C.

FIG. 1 is a top plan view of the substrate treatment apparatus, FIG. 2 is view of the apparatus of FIG. 1 from a direction A-A, FIG. 3 is a view of the apparatus of FIG. 1 from a direction B-B, and FIG. 4 is a view of the apparatus of FIG. 1 from a direction C-C.

Referring to FIGS. 1 to 4, a substrate treatment apparatus 1 comprises a load port 100, an index module 200, a first buffer module 300, a coating and developing module 400, a second buffer A module 500, an exposure pre and post treatment module 600, and an interface module 700. The load port 100, the index module 200, the first buffer module 300, the coating and developing module 400, the second buffer module 500, the exposure pre and post treatment module 600, and the interface module 700 are sequentially disposed in a row in one direction.

Hereinafter, a direction in which the load port 100, the index module 200, the first buffer module 300, the coating and developing module 400, the second buffer module 500, the exposure pre and post treatment module 600 and the interface module 700 are disposed is referred to as a first direction 12. When viewed from above, a direction perpendicular to the first direction 12 is referred to as a second direction 14 and a direction perpendicular to the first direction 12 and the second direction 14 is referred to as a third direction 16.

The substrate W is transferred with being stored in the cassette 20. At this time, the cassette 20 has a structure that can be sealed from the outside. For example, a front open unified pod (FOUP) having a door in the front may be used as the cassette 20.

Hereinafter, the load port 100, the index module 200, the first buffer module 300, the coating and developing module 400, the second buffer module 500, the exposure pre and post treatment module 600, and the interface module 700 will be described in detail.

The load port 100 has a placing supporter 120 on which the cassette 20 with the substrates W being accommodated is placed. A plurality of placing supporters 120 are provided, and the placing supporters 120 are disposed in a row along the second direction 14. In FIG. 1, four placing supporters 120 are provided.

The index module 200 transfers the substrate W between the cassette 20 and the first buffer module 300 placed on the placing supporter 120 of the load port 100. The index module 200 has a frame 210, an index robot 220, and a guide rail 230. The frame 210 has a rectangular parallelepiped shape with an empty inside, and is disposed between the load port 100 and the first buffer module 300. The frame 210 of the index module 200 may be provided at a lower height than the frame 310 of the first buffer module 300 which will be described later. The index robot 220 and the guide rail 230 are disposed in the frame 210. The index robot 220 has a structure which is capable of 4-axis driving so that a hand 221 directly handling the substrate W may move and rotate in the first direction 12, the second direction 14, and the third direction 16. The index robot 220 has a hand 221, an arm 222, a support 223, and a pedestal 224. The hand 221 is fixedly installed on the arm 222. The arm 222 has a stretchable structure and a rotatable structure. The longitudinal direction of the support 223 is disposed along the third direction 16. The arm 222 is coupled to the support 223 so as to be able to move along the support 223. The support 223 is fixedly coupled to the pedestal 224. The longitudinal direction of the guide rail 230 is disposed along the second direction 14. The pedestal 224 is coupled to the guide rail 230 so as to be able to linearly move along the guide rail 230. Additionally, although not shown, a door opener for opening and closing the door of the cassette 20 is further provided on the frame 210.

The first buffer module 300 has a frame 310, a first buffer 320, a second buffer 330, a cooling chamber 350, and a first buffer robot 360. The frame 310 has a rectangular parallelepiped shape with an empty inside, and is disposed between the index module 200 and the coating and developing module 400. The first buffer 320, the second buffer 330, the cooling chamber 350, and the first buffer robot 360 are disposed in the frame 310. The cooling chamber 350, the second buffer 330, and the first buffer 320 are sequentially disposed along the third direction 16 from below. The first buffer 320 is disposed at a height corresponding to the coating module 401 of the coating and developing module 400 which will be described later, and the second buffer 330 and the cooling chamber 350 are disposed at a height corresponding to the developing module 402 of the coating and developing module 400. The first buffer robot 360 is disposed to be spaced apart from the second buffer 330, the cooling chamber 350, and the first buffer 320 by a predetermined distance in the second direction 14.

The first buffer 320 and the second buffer 330 temporarily store a plurality of substrates W, respectively. The second buffer 330 has a housing 331 and a plurality of supports 332. The supports 332 are disposed in the housing 331 and are spaced apart from each other along the third direction 16. One substrate W is placed on each support 332. The housing 331 has openings (not shown) in a direction in which the index robot 220 is provided, in a direction in which the first buffer robot 360 is provided, and in a direction in which a developing unit robot 482 is provided so that the index robot 220, the first buffer robot 360, and the developing unit robot 482 of the developing module 402 which will be described later may load and unload the substrate W to and from the support 332 in the housing 331. The first buffer 320 has a structure substantially similar to the structure of the second buffer 330. But, the housing 321 of the first buffer 320 has an opening in a direction in which the first buffer robot 360 is provided and in a direction in which the coating unit robot 432 disposed in the coating module 401 which will be described later is provided. The number of supports 322 provided to the first buffer 320 and the number of supports 332 provided to the second buffer 330 may be the same or different. In one embodiment, the number of supports 332 provided to the second buffer 330 may be greater than the number of supports 322 provided to the first buffer 320.

The first buffer robot 360 transfers the substrate W between the first buffer 320 and the second buffer 330. The first buffer robot 360 has a hand 361, an arm 362, and a support 363. The hand 361 is fixedly installed on the arm 362. The arm 362 has in a stretchable structure so that the hand 361 is movable along the second direction 14. The arm 362 is coupled to the support 363 so as to be able to linearly move in the third direction 16 along the support 363. The support 363 has a length extending from a position corresponding to the second buffer 330 to a position corresponding to the first buffer 320. The support 363 may be provided longer in an upward or downward direction. The first buffer robot 360 may be provided with the hand 361 being simply driven only by two axes along the second direction 14 and the third direction 16.

The cooling chamber 350 cools the substrate W, respectively. The cooling chamber 350 has a housing 351 and a cooling plate 352. The cooling plate 352 has an upper surface on which the substrate W is placed and a cooling means 353 for cooling the substrate W. The cooling means 353 may have various ways using cooling water or using a thermoelectric element etc. Additionally, a lift pin assembly (not shown) for positioning the substrate W on the cooling plate 352 may be provided in the cooling chamber 350. The housing 351 has an opening (not shown) in a direction in which the index robot 220 is provided and in a direction in which the developing unit robot 482 is provided so that the index robot 220 and the developing unit robot 482 provided in the developing module 402 which will be described later may load and unload the substrate W to and from the cooling plate 352. Additionally, doors (not shown) for opening and closing the aforementioned described opening may be provided in the cooling chamber 350.

The coating and developing module 400 perform a process of coating a photoresist on the substrate W before the exposure process and a process of developing the substrate W after the exposure process. The coating and developing module 400 largely have a rectangular parallelepiped shape. The coating and developing module 400 have a coating module 401 and a developing module 402. The coating module 401 and the developing module 402 are disposed to be partitioned into layers therebetween. In one embodiment, the coating module 401 is disposed above the developing module 402.

The coating module 401 has a process of coating a photoresist on the substrate W, and a heat treatment process such as heating and cooling to the substrate W before and after the resist coating process. The coating module 401 has a resist coating chamber 410, a bake chamber 420, and a transfer chamber 430. The resist coating chamber 410, the bake chamber 420, and the transfer chamber 430 are sequentially disposed along the second direction 14. Accordingly, the resist coating chamber 410 and the bake chamber 420 are disposed to be spaced apart from each other in the second direction 14 with the transfer chamber 430 interposed therebetween. A plurality of resist coating chambers 410 are provided, and a plurality of resist coating chambers 410 are provided in each of the first direction 12 and the third direction 16. An example in which six resist coating chambers 410 are provided is shown in the drawing. A plurality of bake chambers 420 are provided in the first direction 12 and the third direction 16, respectively. An example in which six bake chambers 420 are provided is shown in the drawing. Alternatively, a lot of bake chambers 420 may be provided.

The transfer chamber 430 is disposed parallel to the first buffer 320 of the first buffer module 300 and the first direction 12. A coating unit robot 432 and a guide rail 433 are disposed in the transfer chamber 430. The transfer chamber 430 largely has a rectangular shape. The coating unit robot 432 transfers the substrate W among the bake chambers 420, the resist coating chambers 410, the first buffer 320 of the first buffer module 300, and the first cooling chambers 520 of the second buffer module 500 which will be described later. The longitudinal direction of the guide rail 43 is parallel to the first direction 12. The guide rail 433 guides the coating unit robot 432 to linearly move in the first direction 12. The coating unit robot 432 has a hand 434, an arm 435, a support 436, and a pedestal 437. The hand 434 is fixedly installed on the arm 435. The arm 435 has a stretchable structure to allow the hand 434 to move in the horizontal direction. The longitudinal direction of the support 436 is disposed along the third direction 16. The arm 435 is coupled to the support 436 so as to be able to linearly move in the third direction 16 along the support 436. The support 436 is fixedly coupled to the support 437, and the support 437 is coupled to the guide rail 433 so as to be able to move along the guide rail 433.

All of the resist coating chambers 410 have the same structure. But the types of photoresists used in each resist coating chamber 410 may be different from each other. In one embodiment, a chemical amplification resist may be used as the photoresist.

Referring again to FIGS. 1 to 4, the bake chamber 420 heats the substrate W. For example, the bake chambers perform a variety of processes, including: a prebake process for removing organic matter or moisture from the surface of the substrate W by heating the substrate W to a predetermined temperature before coating the photoresist; or a soft bake process to be performed after coating the photoresist on the substrate W; or a cooling process for cooling the substrate W after each heating process etc. The bake chamber 420 has a cooling plate 421 or a heating plate 422. The cooling plate 421 is provided with a cooling means 423 such as cooling water or a thermoelectric element. Additionally, the heating plate 422 is provided with a heating means 424 such as a hot wire or a thermoelectric element. The cooling plate 421 and the heating plate 422 may be provided in one bake chamber 420, respectively. Some of the bake chambers 420 may have only the cooling plate 421 and other bake chambers 420 may have only the heating plate 422.

The developing module 402 has a developing process for removing a part of the photoresist by supplying a developer to obtain a pattern on the substrate W, and a heating treatment process such as heating and cooling performed on the substrate W before and after the developing process. The developing module 402 has a developing chamber 460, a bake chamber 470, and a transfer chamber 480. The developing chamber 460, the bake chamber 470, and the transfer chamber 480 are sequentially disposed along the second direction 14. Accordingly, the developing chamber 460 and the bake chamber 470 are disposed to be spaced apart from each other in the second direction 14 with the transfer chamber 480 interposed therebetween. A plurality of developing chambers 460 are provided, and the plurality of developing chambers 460 are provided in each of the first direction 12 and the third direction 16. An example in which six developing chambers 460 are provided is shown in the drawing. A plurality of bake chambers 470 are provided in each of the first direction 12 and the third direction 16. An example in which six bake chambers 470 are provided is shown in the drawing. Alternatively, a lot of bake chambers 470 may be provided.

The transfer chamber 480 is disposed parallel to the second buffer 330 of the first buffer module 300 and the first direction 12. A developing unit robot 482 and a guide rail 483 are disposed in the transfer chamber 480. The transfer chamber 480 largely has a rectangular shape. The developing unit robot 482 transfers the substrate W among the bake chambers 470, the developing chambers 460, the second buffer 330 and the cooling chamber 350 of the first buffer module 300, and the second cooling chamber 540 of the second buffer module 500. The longitudinal direction of the guide rail 483 is disposed parallel to the first direction 12. The guide rail 483 guides the developing unit robot 482 to linearly move in the first direction 12. The developing robot 482 has a hand 484, an arm 485, a support 486, and a pedestal 487. The hand 484 is fixedly installed on the arm 485. The arm 485 has a stretchable structure to allow the hand 484 to move in the horizontal direction. The longitudinal direction of support 486 is disposed along the third direction 16. The arm 485 is coupled to the support 486 so as to be able to linearly move in the third direction 16 along the support 486. The support 486 is fixedly coupled to the pedestal 487. The pedestal 487 is coupled to the guide rail 483 so as to be able to move along the guide rail 483.

All of the developing chambers 460 have the same structure. But the types of developing solutions used in each of the developing chambers 460 may be different from each other. The developing chamber 460 removes a region of the photoresist on the substrate W to which light is irradiated. At this time, the region irradiated with light in the protective layer is also removed. Depending on the type of selectively used photoresist, only the regions of the photoresist and the protective layer that are not irradiated with light may be removed.

The developing chamber 460 is provided as a substrate treatment apparatus for removing a part of the photoresist by supplying a developer to obtain a pattern on the substrate W. The substrate treatment apparatus 800 performs a developing process, and a detailed description thereof will be described with reference to FIGS. 5 to 7 below.

The bake chamber 470 heats the substrate W. For example, the bake chambers 470 performs a variety of processes, including: a post bake process for heating the substrate W before the developing process is performed; a hard bake process for heating the substrate W after the developing process is performed; and a cooling process for cooling the wafer being heated after each bake process. The bake chamber 470 has a cooling plate 471 or a heating plate 472. The cooling plate 471 is provided with cooling means 473 such as cooling water or a thermoelectric element. Alternatively, the heating plate 472 is provided with a heating means 474 such as a hot wire or a thermoelectric element. The cooling plate 471 and the heating plate 472 may be provided in one bake chamber 470, respectively. Some of the bake chambers 470 may have only the cooling plate 471 and other bake chambers 470 may have only the heating plate 472.

As described above, the coating module 401 and the developing module 402 are separated from each other in the coating and developing module 400. Additionally, when viewed from above, the coating module 401 and the developing module 402 may have the same chamber arrangement.

The second buffer module 500 is provided as a passage through which the substrate W is transferred between the coating and developing module 400 and the exposure pre and post treatment module 600. Additionally, the second buffer module 500 performs a predetermined process including a cooling process or an edge exposure process etc. on the substrate W. The second buffer module 500 has a frame 510, a buffer 520, a first cooling chamber 530, a second cooling chamber 540, an edge exposure chamber 550, and a second buffer robot 560. The frame 510 has a rectangular parallelepiped shape. The buffer 520, the first cooling chamber 530, the second cooling chamber 540, the edge exposure chamber 550, and the second buffer robot 560 are disposed in the frame 510. The buffer 520, the first cooling chamber 530, and the edge exposure chamber 550 are disposed at a height corresponding to the coating module 401. The second cooling chamber 540 is disposed at a height corresponding to the developing module 402. The buffer 520, the first cooling chamber 530, and the second cooling chamber 540 are sequentially disposed in a row along the third direction 16. When viewed from above, the buffer 520 is disposed along the transfer chamber 430 and the first direction 12 of the coating module 401. The edge exposure chamber 550 is disposed to be spaced apart from the buffer 520 or the first cooling chamber 530 by a predetermined distance in the second direction 14.

The second buffer robot 560 transfers the substrate W among the buffer 520, the first cooling chamber 530, and the edge exposure chamber 550. The second buffer robot 560 is disposed between the edge exposure chamber 550 and the buffer 520. The second buffer robot 560 may have a structure similar to the first buffer robot 360. The first cooling chamber 530 and the edge exposure chamber 550 perform a subsequent process on the wafers W processed by the coating module 401. The first cooling chamber 530 cools the substrate W on which the process was performed in the coating module 401. The first cooling chamber 530 has a structure similar to the cooling chamber 350 of the first buffer module 300. The edge exposure chamber 550 exposes the edges of the wafers W on which the cooling process has been performed in the first cooling chamber 530. The buffer 520 temporarily stores the substrate W before the substrates W processed in the edge exposure chamber 550 are transferred to a pretreatment module 601 which will be described later. The second cooling chamber 540 cools the wafers W before the wafers W processed in the post-treatment module 602 which will be described later are transferred to the developing module 402. The second buffer module 500 may have an additional buffer at a height corresponding to the developing module 402. In this case, the wafers W processed by the post-treatment module 602 may be temporarily stored in the additional buffer and then transferred to the developing module 402.

The exposure pre and post treatment module 600, when the exposure apparatus 1000 performs an immersion exposure process, may perform a process of coating a protective film to protect the photoresist film coated to the substrate W during immersion exposure. Additionally, the exposure pre and post treatment module 600 may perform a process of cleaning the substrate W after exposure process. Additionally, when the coating process is performed using a chemically amplified resist, the exposure pre and post treatment module 600 may perform a bake process after exposure process.

The exposure pre and post treatment module 600 has a pretreatment module 601 and a post-treatment module 602. The pretreatment module 601 performs a process of treatment the substrate W before performing the exposure process, and the post-treatment module 602 performs a process of treatment the substrate W after the exposure process. The pretreatment module 601 and the post-treatment module 602 are disposed to be partitioned into layers therebetween. According to one example, the pretreatment module 601 is disposed above the post-treatment module 602. The pretreatment module 601 is provided at the same height as the coating module 401. The post-treatment module 602 is provided at the same height as the developing module 402. The pretreatment module 601 has a protective film coating chamber 610, a bake chamber 620, and a transfer chamber 630. The protective film coating chamber 610, the transfer chamber 630, and the bake chamber 620 are sequentially disposed along the second direction 14. Accordingly, the protective film coating chamber 610 and the bake chamber 620 are disposed to be spaced apart from each other in the second direction 14 with the transfer chamber 630 therebetween. A plurality of protective film coating chambers 610 are provided, and are disposed along the third direction 16 to form layers with each other. A plurality of protective layer coating chambers 610 may be provided in each of the first direction 12 and the third direction 16. A plurality of bake chambers 620 are provided, and are disposed along the third direction 16 to form layers with each other. The plurality of bake chambers 620 may be provided in each of the first direction 12 and the third direction 16.

The transfer chamber 630 is disposed parallel to the first cooling chamber 530 of the second buffer module 500 and the first direction 12. A pretreatment robot 632 is disposed in the transfer chamber 630. The transfer chamber 630 largely has a square or rectangular shape. The pretreatment robot 632 transfers the substrate W among the protective film coating chambers 610, the bake chambers 620, the buffer 520 of the second buffer module 500, and the first buffer 720 of the interface module 700 which will be described later. The pretreatment robot 632 has a hand 633, an arm 634, and a support 635. The hand 633 is fixedly installed on the arm 634. The arm 634 has a stretchable structure and a rotatable structure. The arm 634 is coupled to the support 635 so as to be able to linearly move along the support 635 in the third direction 16.

The protective film coating chamber 610 coats a protective film to protect the resist film on the substrate W during immersion exposure. The protective film coating chamber 610 has a housing 611, a support plate 612, and a nozzle 613. The housing 611 has a cup shape with an open top. The support plate 612 is disposed in the housing 611 and supports the substrate W. The support plate 612 is rotationally provided. The nozzle 613 supplies a protective liquid for forming a protective film onto the substrate W placed on the support plate 612. The nozzle 613 has a circular tubular shape, and a protective liquid can be supplied to the center of the substrate W. The nozzle 613 may have a length corresponding to the diameter of the substrate W, and the discharge port of the nozzle 613 may be provided as a slit. In this case, the support plate 612 may be fixed. The protective liquid contains a foam-able material. As the protective liquid, a photoresist and a material having a low affinity for water may be used. For example, the protective liquid may contain a fluorine-based solvent. The protective film coating chamber 610 supplies the protective liquid to the central region of the substrate W while rotating the substrate W placed on the support plate 612.

The bake chamber 620 heats the substrate W on which the protective film is coated. The bake chamber 620 has a cooling plate 621 or a heating plate 622. The cooling plate 621 is provided with a cooling means 623 such as cooling water or a thermoelectric element. Alternatively, the heating plate 622 is provided with a heating means 624 such as a hot wire or a thermoelectric element. The heating plate 622 and the cooling plate 621 may be provided in one bake chamber 620, respectively. Some of the bake chambers 620 may have only the heating plate 622 and other bake chambers 620 may have only the cooling plate 621.

The post-treatment module 602 has a cleaning chamber 660, a post-exposure bake chamber 670, and a transfer chamber 680. The cleaning chamber 660, the transfer chamber 680, and the post-exposure bake chamber 670 are sequentially disposed along the second direction 14. Accordingly, the cleaning chamber 660 and the post-exposure bake chamber 670 are disposed to be spaced apart from each other in the second direction 14 with the transfer chamber 680 interposed therebetween. A plurality of cleaning chambers 660 are provided, and may be disposed along the third direction 16 to form layers with each other. A plurality of cleaning chambers 660 may be provided in each of the first direction 12 and the third direction 16. The plurality of post-exposure bake chambers 670 are provided, and may be disposed along the third direction 16 to form layers with each other. The plurality of post-exposure bake chambers 670 may be provided in the first direction 12 and the third direction 16, respectively.

The transfer chamber 680 is disposed parallel to the second cooling chamber 540 of the second buffer module 500 and the first direction 12 when viewed from above. The transfer chamber 680 largely has a square or rectangular shape. A post-treatment robot 682 is disposed in the transfer chamber 680. The post-treatment robot 682 transfers the substrate W among the cleaning chambers 660, the post-exposure bake chambers 670, the second cooling chamber 540 of the second buffer module 500, and the second buffers 730 of the interface module 700 which will be described later. The post-treatment robot 682 provided to the post-treatment module 602 may have the same structure as the pretreatment robot 632 provided to the pretreatment module 601.

The cleaning chamber 660 cleans the substrate W after exposure process. The cleaning chamber 660 has a housing 661, a support plate 662, and a nozzle 663. The housing 661 has a cup shape with an open top. The support plate 662 is disposed in the housing 661 and supports the substrate W. The support plate 662 is rotationally provided. The nozzle 663 supplies a cleaning liquid onto the substrate W placed on the support plate 662. Water such as deionized water may be used as the cleaning liquid. The cleaning chamber 660 supplies a cleaning solution to a central region of the substrate W while rotating the substrate W placed on the support plate 662. While the substrate W is rotated, the nozzle 663 may rotate or linearly move from the center region of the substrate W to the edge region.

The post-exposure bake chamber 670 heats the substrate W on which the exposure process has been performed using far ultraviolet rays. In the post-exposure bake process, the substrate W is heated to amplify the acid generated in the photoresist by exposure to change the properties of the photoresist. The post-exposure bake chamber 670 has a heating plate 672. The heating plate 672 is provided with a heating means 674 such as a hot wire or a thermoelectric element. The post-exposure bake chamber 670 may further have a cooling plate 671 therein. The cooling plate 671 is provided with a cooling means 673 such as cooling water or a thermoelectric element. Additionally, a bake chamber having only the cooling plate 671 may be further provided.

As described above, the pretreatment module 601 and the post-treatment module 602 are completely separated from each other in the pre and post exposure treatment module 600. Additionally, the transfer chamber 630 of the pretreatment module 601 and the transfer chamber 680 of the post-treatment module 602 are provided in the same size, and may be provided so as to completely overlap each other when viewed from above. Additionally, the protective film coating chamber 610 and the cleaning chamber 660 may have the same size as each other and may be provided so as to completely overlap each other when viewed from above. Additionally, the bake chamber 620 and the post-exposure bake chamber 670 may have the same size and may be completely overlapped with each other when viewed from above.

The interface module 700 transfers the substrate W among the exposure treatment module 600 and the exposure apparatus 1000 before and after exposure process. The interface module 700 has a frame 710, a first buffer 720, a second buffer 730, and an interface robot 740. The first buffer 720, the second buffer 730, and the interface robot 740 are disposed in the frame 710. The first buffer 720 and the second buffer 730 are spaced apart from each other by a predetermined distance and are disposed to be stacked on each other. The first buffer 720 is disposed higher than the second buffer 730. The first buffer 720 is disposed at a height corresponding to the pretreatment module 601, and the second buffer 730 is disposed at a height corresponding to the post-treatment module 602. When viewed from above, the first buffer 720 is disposed in a row along the transfer chamber 630 of the pretreatment module 601 and the first direction 12, and the second buffer 730 is disposed in a row along the transfer chamber 630 of the post-treatment module 602 and the first direction 12.

The interface robot 740 is disposed to be spaced apart from the first buffer 720 and the second buffer 730 in the second direction 14. The interface robot 740 transfers the substrate W among the first buffer 720, the second buffer 730, and the exposure apparatus 1000. The interface robot 740 has a structure substantially similar to the structure of the second buffer robot 560.

The first buffer 720 temporarily stores the substrates W that have been processed in the pretreatment module 601 before being transferred to the exposure apparatus 1000. Additionally, the second buffer 730 temporarily stores the substrates W that have been processed in the exposure apparatus 1000 before being transferred to the post-treatment module 602. The first buffer 720 has a housing 721 and a plurality of supports 722. The plurality of supports 722 are disposed in the housing 721 and are spaced apart from each other along the third direction 16. One substrate W is placed on each of the supports 722. The housing 721 has an opening (not shown) in a direction in which the interface robot 740 is provided and in a direction in which the pretreatment robot 632 is provided so that the interface robot 740 and the pretreatment robot 632 may load or unload the substrate W to and from the support 722 into the housing 721. The second buffer 730 has a structure substantially similar to the structure of the first buffer 720. But the housing 4531 of the second buffer 730 has an opening (not shown) in a direction in which the interface robot 740 is provided and in a direction in which the post-treatment robot 682 is provided. As described above, only buffers and a robot may be provided to the interface module without providing a chamber for performing a predetermined process on the wafer.

Figure 5:
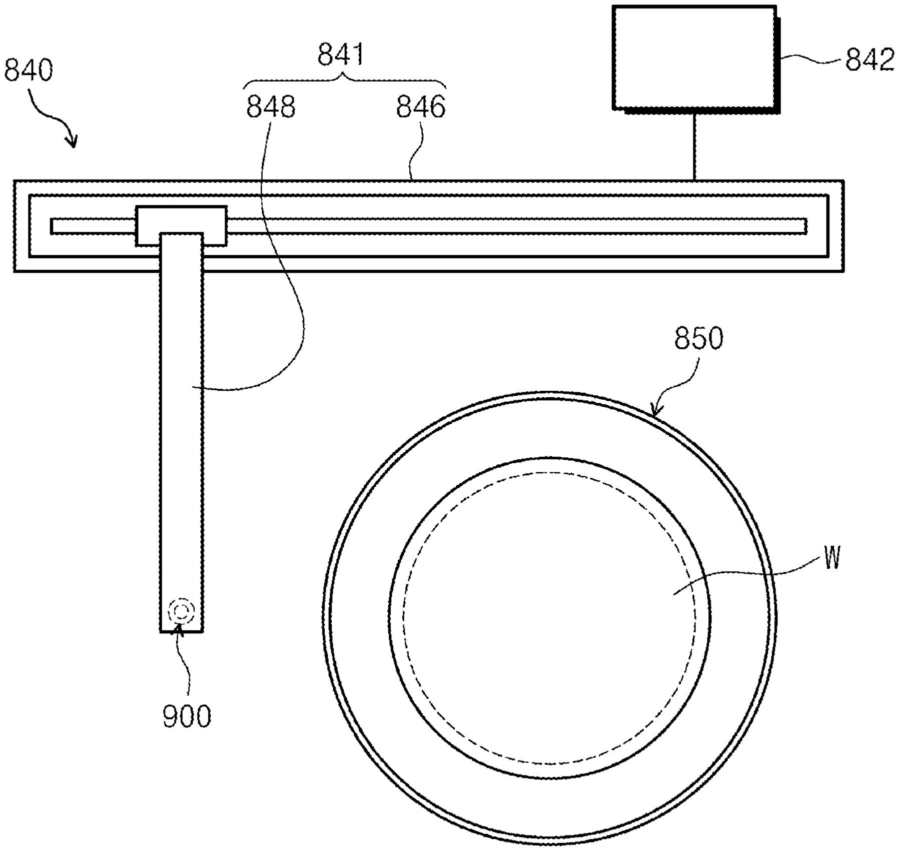
FIG. 5 is a plan view of a substrate treatment apparatus of FIG. 1.
Figure 6:
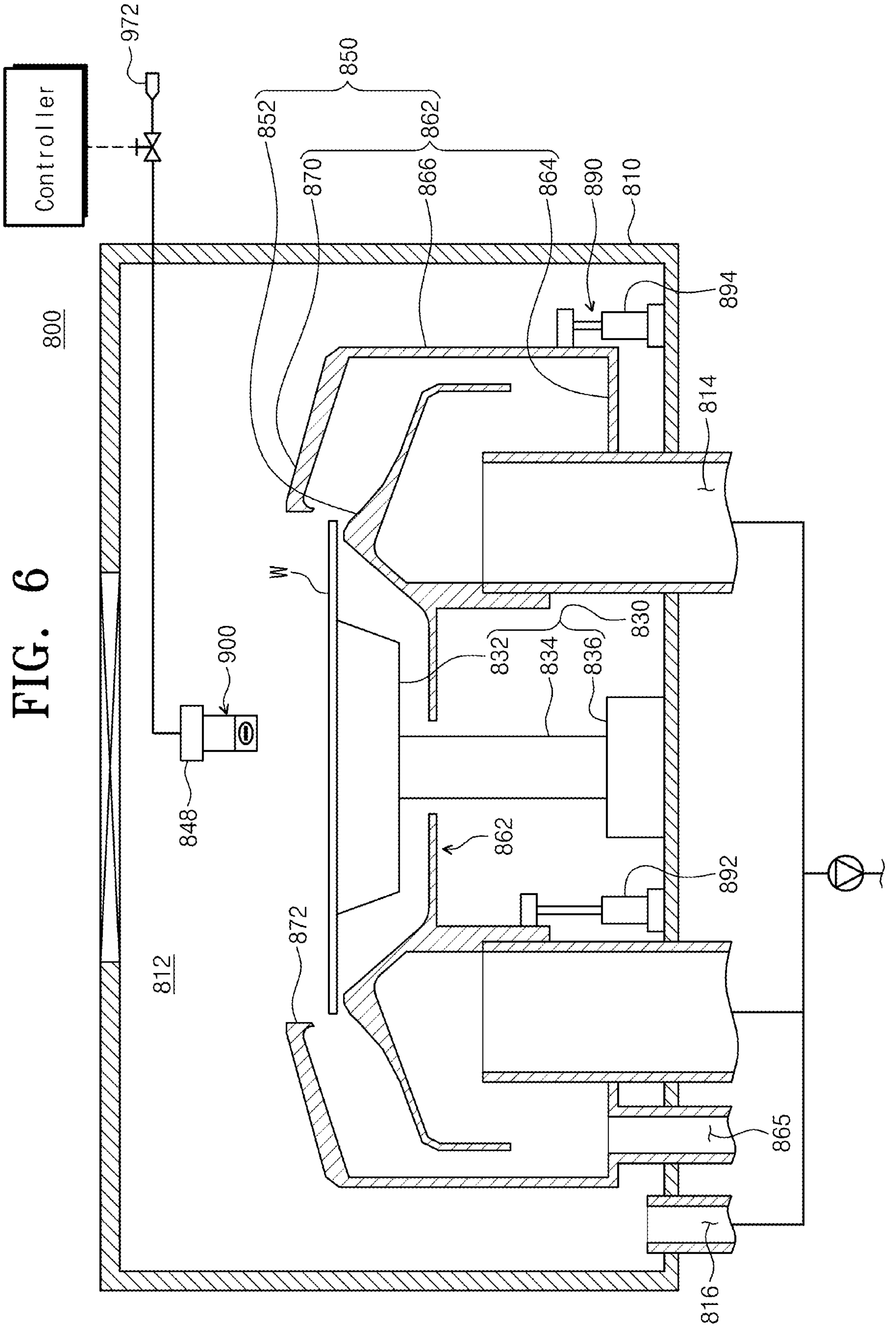
FIG. 6 is a plan view of a substrate treatment apparatus of FIG. 1.

FIG. 5 is a plan view of the substrate treatment apparatus of FIG. 3, and FIG. 6 is a cross-sectional view of the substrate treatment apparatus of FIG. 3.

Referring to FIGS. 5 and 6, the substrate treatment apparatus 800 has a housing 810, a substrate support unit 830, a treatment vessel 850, a lifting unit 890, a liquid supply unit 840, and a controller 880.

The housing 810 has a rectangular cylindrical shape having a treatment space 812 therein. An opening (not shown) is formed at one side of the housing 810. The opening functions as an inlet through which the substrate W is loaded and unloaded. A door is installed in the opening, and the door opens and closes the opening. When the substrate treatment process proceeds, the door closes the opening to seal the treatment space 812 of the housing 810. An inner exhaust port 814 and an outer exhaust port 816 are formed on the lower surface of the housing 810. The airflow formed in the housing 810 is exhausted to the outside through the inner exhaust port 814 and the outer exhaust port 816. In one embodiment, the airflow provided in the treatment vessel 850 may be exhausted through the inner exhaust port 814, and the airflow provided outside the treatment vessel 850 may be exhausted through the outer exhaust port 816.

The substrate support unit 830 supports the substrate W in the treatment space 812 of the housing 810. The substrate support unit 830 rotates the substrate W. The substrate support unit 830 has a spin chuck 832, a rotation axis 834, and a driver 836. The spin chuck 832 is provided as a substrate supporter 832 supporting a substrate. The spin chuck 832 has a circular plate shape. The substrate W is in contact with the upper surface of the spin chuck 832. The spin chuck 832 has a diameter smaller than the diameter of the substrate W. In one embodiment, the spin chuck 832 may chuck the substrate W by vacuum sucking the substrate W. Alternatively, the spin chuck 832 may be provided as an electrostatic chuck for chucking the substrate W using static electricity. Additionally, the spin chuck 832 may chuck the substrate W with a physical force.

The rotation axis 834 and the driver 836 are provided as rotation drivers 834 and 836 for rotating the spin chuck 832. The rotation axis 834 supports the spin chuck 832 under the spin chuck 832. The longitudinal direction of the rotation axis 834 faces up and down. The rotation axis 834 is rotationally provided based on its central axis. The driver 836 provides a driving force so that the rotation axis 834 is rotated. For example, the driver 836 may be a motor capable of varying the rotational speed of a rotation axis. The rotation drivers 834 and 836 may rotate the spin chuck 832 at different rotation speeds according to a substrate treatment step.

The treatment vessel 850 provides a treatment space 812 in which a developing process is performed. The treatment vessel 850 is provided to surround the substrate support unit 830. The treatment vessel 850 has a cup shape with an open top. The treatment vessel 850 has an inner cup 852 and an outer cup 862.

The inner cup 852 has a circular cup shape surrounding the rotation axis 834. When viewed from above, the inner cup 852 is disposed to overlap the inner exhaust port 814. When viewed from above, the outer and inner regions of the upper surface of the inner cup 852 are inclined at different angles from each other. In one embodiment, the outer region of the inner cup 852 inclines down inwardly away from the substrate support unit 830, and the inner region inclines up outwardly away from the substrate support unit 830. A point where the outer region and the inner region of the inner cup 852 meet each other corresponds to the side end of the substrate W in the vertical direction. A region outside the upper surface of the inner cup 852 is provided to be rounded. A region outside the upper surface of the inner cup 852 is provided concave down. A region outside the upper surface of the inner cup 852 may be provided as a region through which the treatment liquid flows.

The outer cup 862 has a cup shape surrounding the substrate support unit 830 and the inner cup 852. The outer cup 862 has a bottom wall 864, a side wall 866, and an inclined wall 870. The bottom wall 864 has a circular plate shape having a hollow. A recovery line 865 is formed on the bottom wall 864. The recovery line 865 recovers the treatment liquid supplied on the substrate W. The treatment liquid recovered by the recovery line 865 may be reused by an external liquid recovery system. The sidewall 866 has a circular cylindrical shape surrounding the substrate support unit 830. The side wall 866 extends in a vertical direction from the side end of the bottom wall 864. Side wall 866 extends upward from bottom wall 864.

The inclined wall 870 extends in the inner direction of the outer cup 862 from the upper end of the side wall 866. The inclined wall 870 is closer to the substrate support unit 830 as it goes upward. The inclined wall 870 has a ring shape. The upper end of the inclined wall 870 is disposed higher than the substrate W supported by the substrate support unit 830.

The lifting unit 890 lifts the inner cup 852 and the outer cup 862 up and down, respectively. The lifting unit 890 has an inner moving member 892 and an outer moving member 894. The inner moving member 892 lifts the inner cup 852 up and down, and the outer moving member 894 lifts the outer cup 862 up and down.

The liquid supply unit 840 may selectively supply various types of treatment fluids on the substrate W.

In one embodiment, the liquid supply unit 840 may have a nozzle moving member 841 and a nozzle apparatus 900.

The nozzle moving member 841 may have a plurality of guide members 846 and arms 848 for moving the nozzle apparatus 900 relative to the substrate. The guide member 846 may have a guide rail 846 for moving the arm 848 in a horizontal direction. The guide rail 846 is disposed on one side of the treatment vessel. The longitudinal direction of the guide rail 846 faces the horizontal direction. An arm 848 is installed on the guide rail 846. For example, the arm 848 may be moved by a linear motor provided inside the guide rail 846. When viewed from above, the arm 848 may face a longitudinal direction perpendicular to the guide rail 846. One end of the arm 848 is mounted on the guide rail 846. In another embodiment, the arm 848 may be provided for swing rotation by being coupled to a rotation axis whose length direction faces the third direction.

The nozzle apparatus 900 may be installed at the bottom of the other end of the arm 848. The nozzle apparatus 900 may supply a treatment fluid onto the substrate W. For example, the treatment fluid may be a developer or ultrapure water.

Figure 7:
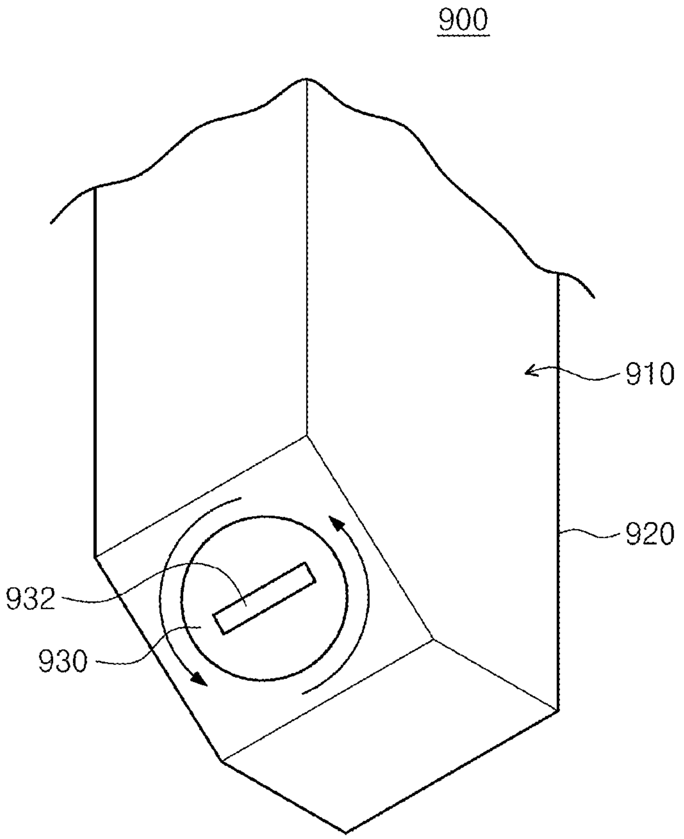
FIG. 7 is a view of a nozzle tip of a nozzle apparatus.
Figure 8:
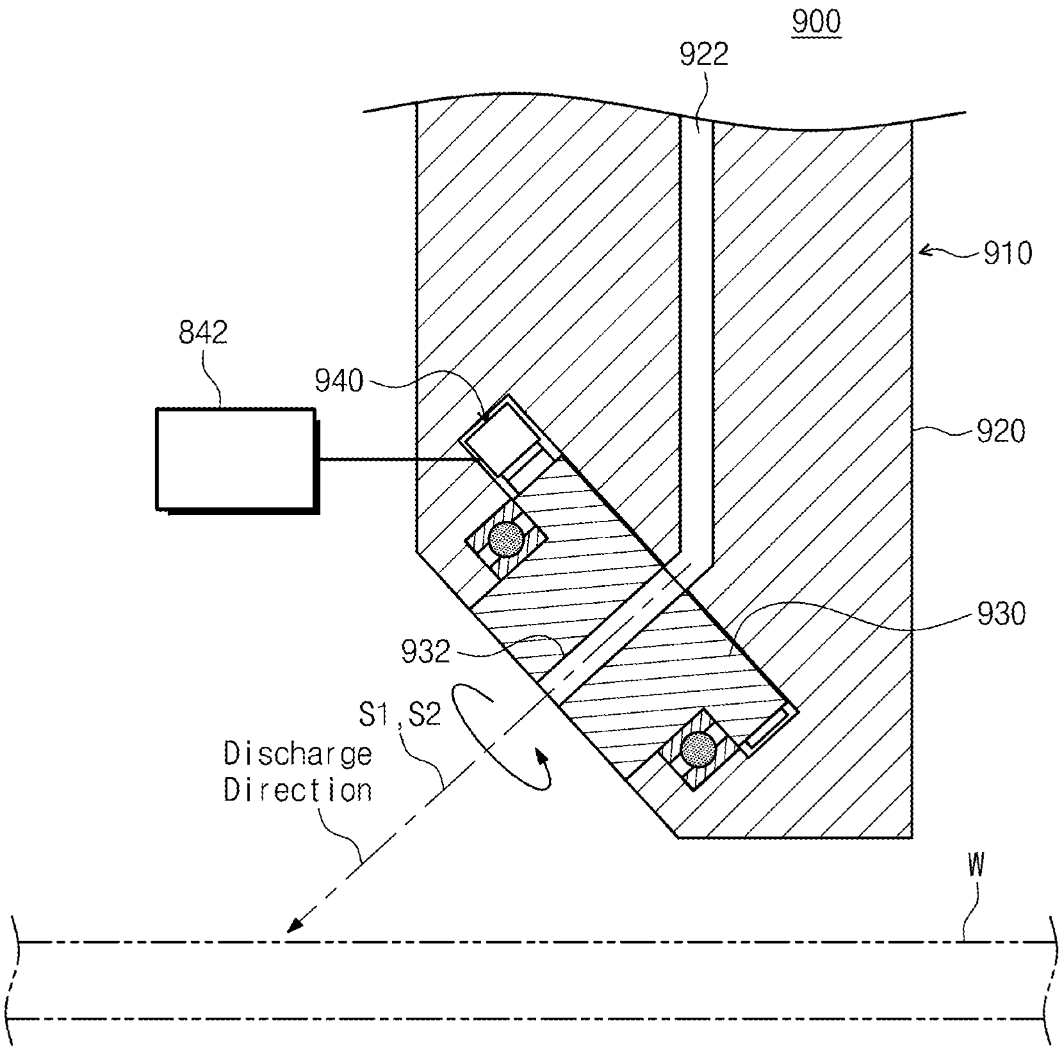
FIG. 8 is a cross-sectional view of concave portion of the nozzle apparatus.

FIG. 7 is a view of a nozzle tip of the nozzle apparatus, FIG. 8 is a cross-sectional view of the concave portion of the nozzle apparatus.

FIGS. 7 and 8, the nozzle apparatus 900 may have a nozzle 910 for discharging a developer. The nozzle 910 may have a nozzle body 920, a nozzle tip 930, and a rotating member 940. A nozzle tip 930 may be provided on an inclined bottom surface of the nozzle body 920. The nozzle tip 930 has a slit type discharge port 932. The discharge direction of the discharge port 932 may incline down inwardly with respect to the surface of the substrate W. The nozzle tip 930 may be installed on the nozzle body 920 so as to be rotationally provided. To do so, a bearing means such as a bearing may be provided between the nozzle tip 930 and the nozzle body 920.

A flow path 922 connected to the discharge port 932 is provided inside the nozzle body 920, and the flow path 922 may be connected to a developer supply unit (not shown).

The rotating member 940 may rotate the nozzle tip 930 so that the developer (treatment fluid) is rotated and sprayed onto the substrate. The rotating member 930 may be provided in the nozzle body 920. The rotation member 940 may rotate the nozzle tip 930 in various rotation methods, and a detailed description thereof will be omitted. Preferably, the rotation center S1 of the nozzle tip 930 coincides with the discharge center S2 of the discharge port 932. The rotation direction of the nozzle tip 930 may be a direction opposite to the rotation direction of the substrate. That is, as the substrate and the nozzle tip 930 rotate in opposite directions, the effect of separating particles and residues from the substrate may be increased by reducing inertia. But the rotation direction of the nozzle tip 930 is not limited thereto, and may be the same as the rotation direction of the substrate, if necessary.

Figure 9:
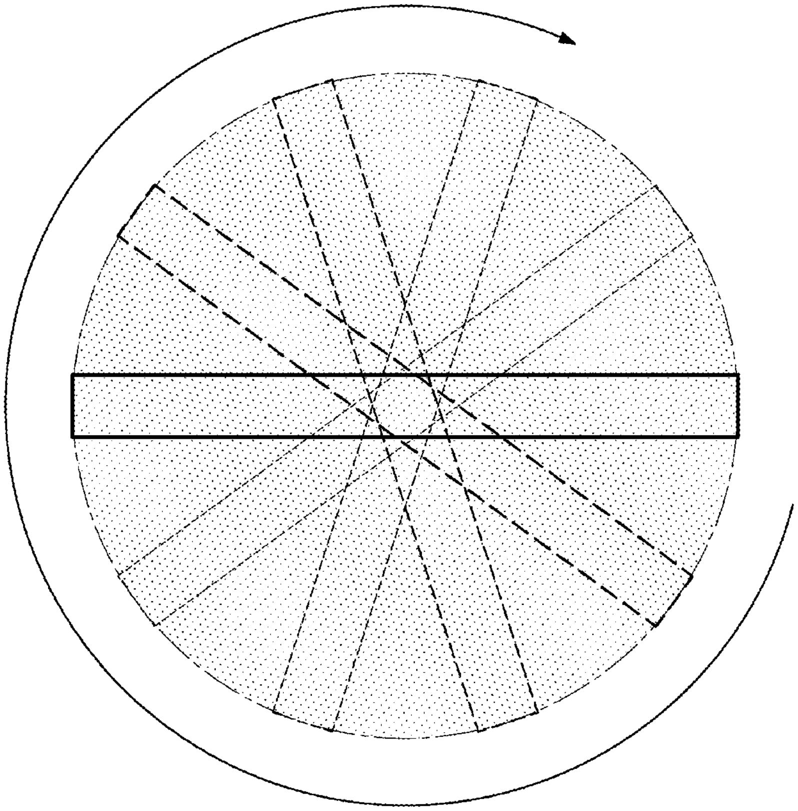
FIG. 9 is a view of a developer applied on a substrate in a shape close to a circle by a rotating nozzle tip.

As shown in FIG. 9, the developer is discharged in a slit shape, but may be coated on the substrate in a shape close to a circle by a rotating nozzle tip. So, the hitting force of the developer discharged to the substrate can be increased.

For reference, the controller 842 may control the operation of the nozzle moving member 841 and the rotating member 940 to discharge the developer from the discharge port of the rotating nozzle tip while moving the nozzle 910 on the substrate.

Figure 10:
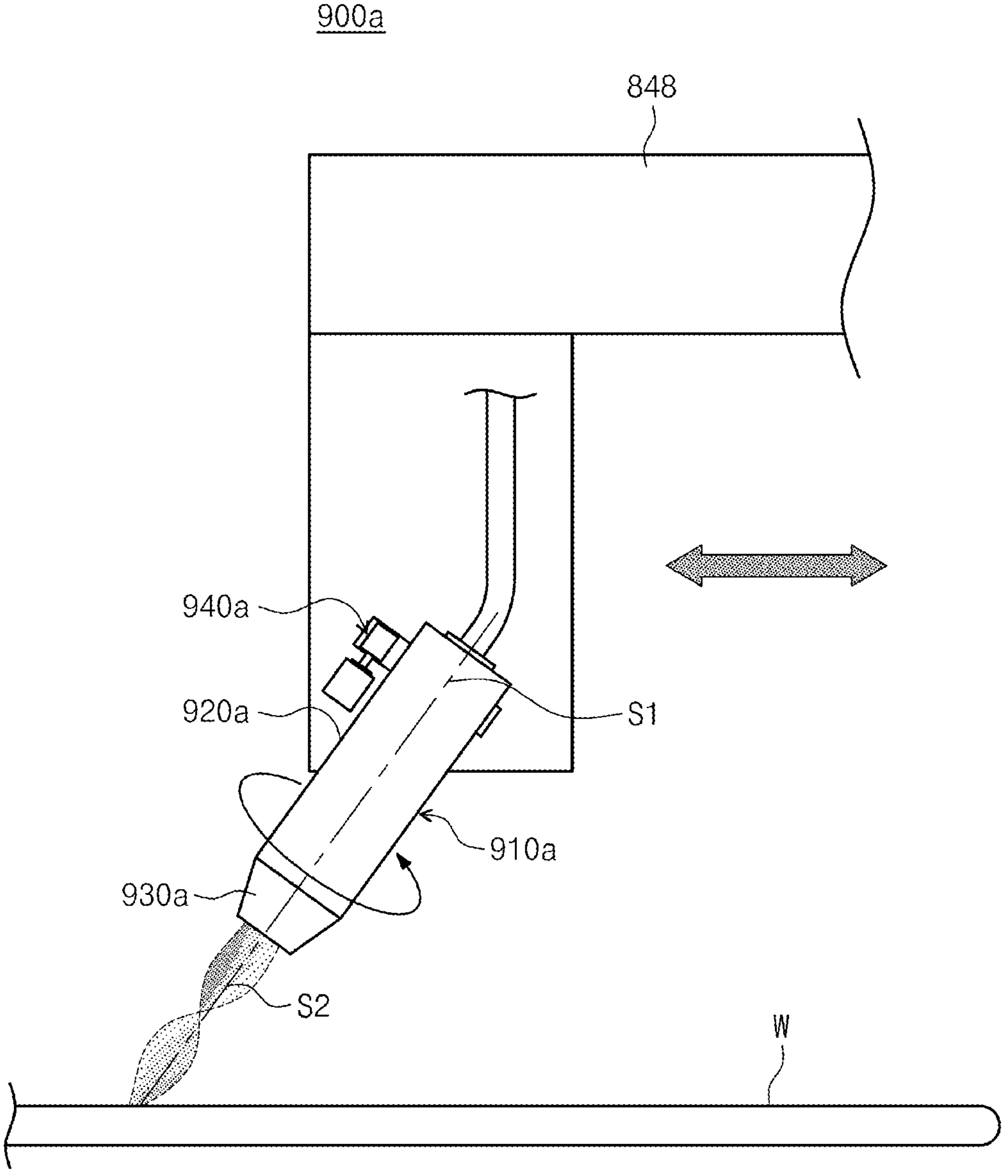
FIG. 10 is a view of another embodiment of the nozzle apparatus.

FIG. 10 is a view of another embodiment of the nozzle apparatus.

Redundant descriptions of components that are the same as or corresponding to the aforementioned embodiment may be omitted in the embodiment of FIG. 10.

The nozzle 910*a* of the nozzle apparatus 900*a* according to the embodiment of FIG. 1 has a nozzle body 920*a*, a nozzle tip 930*a*, and a rotating member 940*a*, which are shown in the previously described embodiment. Configurations and functions are substantially similar to the nozzle body 920, the nozzle tip 930, and the rotating member 940, thus a modified example will be described below, focusing on differences from the present embodiment.

According to the exemplary embodiment of the present disclosure, the rotation member (940*a*) has a feature that rotates the nozzle body (920*a*). Preferably, the rotation center S1 of the nozzle body 920 coincides with the discharge center S2 of the discharge port 932. The rotating member 940*a* may be installed on the arm 848 to rotate the nozzle body 920*a*.

It should be understood that the above embodiments have been presented to aid understanding of the present disclosure, and do not limit the scope of the present disclosure, and various deformable embodiments from this are also within the scope of the present disclosure. The technical protection scope of the present disclosure should be determined by the technical idea of the claims, and it should be understood that the technical protection scope of the present disclosure is not limited to the literal description of the claims itself, but extends to a scope that has substantially equal technical value.

| | |
|---|---|
| 810: | Housing |
| 820: | Airflow Providing Unit |
| 830: | Substrate Support Unit |
| 840: | Liquid Supply Unit |
| 850: | Treatment Vessel |
| 880: | Controller |
| 885: | Exhaust Unit |
| 890: | Lifting Unit |
| 900: | Nozzle Apparatus |
| 910: | Nozzle |
| 920: | Nozzle Body |
| 930: | Nozzle Tip |
| 940: | Rotating Member |

What is claimed is:

1. A nozzle apparatus, comprising:

a nozzle body having a nozzle tip with a discharge port for spraying a treatment fluid onto a substrate;

a nozzle moving means for moving the nozzle body relative to the substrate;

a rotating member for rotating the nozzle body or the nozzle tip so that a treatment fluid is rotationally sprayed onto the substrate; and a control unit for controlling an operation of the nozzle moving means and the rotating member, wherein the rotating member rotates the nozzle tip along an axis of rotation inclined with respect to a surface of the substrate, wherein the rotating member is embedded inside a recess provided in the nozzle body to rotate the nozzle tip inside the nozzle body, and wherein the substrate treatment apparatus further comprises a bearing provided between the nozzle tip and the nozzle body to facilitate the rotation of the nozzle tip inside the recess of the nozzle body.

2. The nozzle apparatus of claim 1, wherein the discharge port has a slit shape and is provided to spray the treatment fluid at a predetermined angle inclined to the surface of the substrate.

3. The nozzle apparatus of claim 2, wherein an axis of rotation of the nozzle tip corresponds to a discharge direction of the treatment fluid from the discharge port.

4. A substrate treatment apparatus, comprising:

a supporter rotating in one direction with a substrate seated thereon;

a nozzle apparatus disposed above the supporter and having a nozzle body for spraying a treatment fluid onto a substrate, wherein the nozzle body sprays the treatment fluid onto the substrate while scanning and rotating, and wherein the nozzle body comprises a nozzle tip rotationally provided in the nozzle body and having a discharge port; and a rotating member for rotating the nozzle tip, wherein the rotating member rotates the nozzle tip along an axis of rotation inclined with respect to a surface of the substrate.

5. The substrate treatment apparatus for claim 4, wherein the nozzle body rotates in a direction opposite to the rotation direction of the supporter.

6. The substrate treatment apparatus for claim 4, wherein the nozzle body is provided with the discharge port in a slit shape.

7. The substrate treatment apparatus for claim 4, wherein the nozzle body is provided with a plurality of holes disposed along one direction.

8. The substrate treatment apparatus for claim 4, wherein the nozzle apparatus further comprises a rotating member rotates for rotating the nozzle body and the nozzle tip is rotated by a rotation of the nozzle body.

9. The substrate treatment apparatus of claim 4, wherein the nozzle tip sprays a chemical liquid at a predetermined angle inclined to the surface of the substrate.

10. The substrate treatment apparatus of claim 4, further comprising:

a nozzle moving means for moving the nozzle body relative to the supporter; and a control unit for controlling an operation of the nozzle moving means, wherein the discharge port has a slit shaped cross-section, and wherein the control unit controls an operation of the nozzle moving means and the rotating member so that the nozzle tip rotates and discharges a chemical liquid from the discharge port while moving the nozzle body over the substrate.

11. The substrate treatment apparatus of claim 10, wherein the axis of rotation of the nozzle tip corresponds to a discharge direction of the discharge port, and wherein the discharge port has a slit shape and is provided to spray the chemical liquid at a predetermined angle inclined to the surface of the substrate.

12. A substrate treatment apparatus, comprising: a supporter rotating in one direction with a substrate seated thereon; and a nozzle discharging a treatment fluid onto a substrate, wherein the nozzle comprises: a nozzle tip with a discharge port in a slit shape discharging the treatment fluid; and a rotating member for rotating the nozzle tip about an axis of rotation, and wherein the axis of rotation is perpendicular to a longitudinal direction of the discharge port and a width direction of the discharge port, respectively, and passes through a center of the discharge port in the longitudinal direction, wherein the nozzle comprises a nozzle body having the nozzle tip, and wherein the rotating member rotates directly the nozzle tip relative to the nozzle body.

13. The substrate treatment apparatus of claim 12, wherein the discharge port is provided to spray the treatment fluid at a predetermined angle inclined to a surface of the substrate.

14. The substrate treatment apparatus of claim 13, wherein the axis of rotation of the nozzle tip corresponds to a discharge direction of the treatment fluid from the discharge port.

15. The substrate treatment apparatus of claim 12, wherein the nozzle comprises a nozzle body having the nozzle tip, and wherein the nozzle body is installed on an arm, the rotating member rotates the nozzle body relative to the arm, and the nozzle tip is rotated by a rotation of the nozzle body.

16. The substrate treatment apparatus of claim 12, wherein the rotating member is embedded in a recess provided inside the nozzle body to rotate the nozzle tip inside the nozzle body.

17. The substrate treatment apparatus of claim 12, wherein the nozzle comprises a nozzle body having the nozzle tip, and wherein the nozzle body rotates in a direction opposite to a rotation direction of the supporter.

18. The substrate treatment apparatus of claim 12, wherein further comprising: a nozzle moving means for moving the nozzle relative to the supporter; and a control unit for controlling an operation of the nozzle moving means, and wherein the control unit controls an operation of the nozzle moving means and the rotating member so that the nozzle tip rotates and discharges the treatment fluid from the discharge port while moving the nozzle over the substrate.

* * * * *